United States Patent Office.

CHARLES M. JACOB, OF PARIS, FRANCE.

COMPOSITION FOR COATING SURFACES.

SPECIFICATION forming part of Letters Patent No. 234,675, dated November 23, 1880.

Application filed April 22, 1880. (Specimens.) Patented in England June 22, 1878.

*To all whom it may concern:*

Be it known that I, CHARLES M. JACOB, of Paris, France, have invented certain Improvements in the preparation of pyroxyline for the purpose of coating textile or other surfaces and giving them a metallic or other ornamental appearance, of which the following is a specification.

My invention relates to a new and improved mode of preparing pyroxyline in order to make it fit for producing a good and satisfactory coating for all materials, whether stiff or pliable, of a metallic or other ornamental appearance.

A great many modes of preparation of the pyroxyline for applications of indefinite number and sorts have already been proposed; but not one of them has yet given, in my opinion, the satisfactory results in point of appearance, solidity, pliancy, and economy attained by me by the improvements hereinafter described.

In a former patent to me dated May 15, 1877, and numbered 190,865, I described a new mode of capsuling bottles and jars by the use of pyroxyline, which invention is now practiced to a great extent and with great advantage.

The present invention consists in certain improvements in the preparation of the pyroxyline over the preparation therein described, whereby its usefulness as a coating is extended to surfaces of all kinds and natures, the improvements enabling the material to adapt itself to any and all surfaces, and also improving the material as to appearance, durability, and variety of coloring. To secure these results I proceed as follows: I first treat the cotton-wool, by preference, with monohydrated nitric acid mixed with concentrated (66°) sulphuric acid, pyroxyline thus obtained being far more soluble than when prepared by means of trade acids, as is usually practiced. I next dry the pyroxyline thoroughly and dissolve it in a mixture formed of equal portions of ether and alcohol or methylene, in the proportion of about ten to fifteen parts of pyroxyline to one hundred parts of the solvent. The ether may be omitted; but I prefer using it, as it assists considerably in drying the solution. If left in this state, the collodion thus obtained is found to be brittle, too fluid, and liable to turn dull when colored. In order to insure suppleness, so as to admit of the application of the coating to fabrics and flexible or pliant substances without liability of cracking or checking, I add, say, about from eight to ten per cent. of creosote procured from Norway tar or beech-tar, in lieu of the castor-oil generally used, which does not work well, and causes white spots to appear on the collodion. I also add to the creosote a small proportion of linseed-oil cooked with black oxide of manganese, which dries rapidly and gives a particularly unctuous consistence. The creosote is obtained from the distillation of the fumes arising in the carbonization of the Norway beech. The creosote thus obtained (the process being well known in the art) is quite different from carbolic acid, being a neutral body, and differs from phenol in the important respect that it will at once incorporate itself into the collodion, while phenol precipitates. This peculiar property of mixing at once with the collodion renders the creosote so obtained peculiarly valuable for use in the surfacing compound, imparting to it the properties of pliancy and suppleness in a degree which cannot be attained otherwise, and permitting even the embossing of surfaces coated with it without cracking or breaking.

The preparation of the oil is effected by adding about ten per cent. of powdered black oxide of manganese to the oil during its cooking. After the cooking is finished the oil is allowed to rest, the manganese precipitates, and is separated from the oil by decantation or filtration. The oil thus treated has a far more active drying power than the oil treated as usual with white lead, red lead, or similar substances.

Linseed-oil, after undergoing the action of black oxide of manganese, is about six to eight times as active for drying as pure oil. The consequence is, that it acts more in unison with the etherized collodion in vaporizing and drying.

In order to thicken the layer or coating and to give it brilliancy, I add to the above mixture about ten per cent. of rosin from the *Pinus maritima*, or like substance. The use of creosote assists greatly in keeping the collodion from corruption.

The compound thus prepared is ready for use as a protective coating or surfacing; but if it be desired to use the same for the purposes of ornamentation, as well as for its protective properties, it may be used as a vehicle for coloring or metallizing substances or materials.

For producing coloration I use, by preference, the colors derived from aniline, which should be added according to the shade required, rather than any of the pigments and mineral colors hitherto employed.

For affording the metallization of the mixture after the solution is thus completely prepared, I add about ten to fifteen per cent. of bronze or other metal powder fit for giving the appearance required after having reduced the same to an impalpable state, and the whole is then carefully and thoroughly mixed. The compound is then ready for application, which may be effected with a brush by dipping or by any other convenient means.

By the above preparation a coating may be produced which will be found as brilliant, resisting, and homogeneous as would the metal itself. Any desired appearance, whether metallic or merely colored, may be given to any and all surfaces without liability of injury to the coating by reason of the pliant, flexible, or elastic nature of the surface coated, and no bubbles occur in the coating; or, as above stated, the coloration and metallization may be omitted. Such coating may be applied to glass, wood, smooth or carved, or embossed leather, metals, thread, fabrics, and tissues of various kinds, cane, straw, paper, and other animal, vegetable, and mineral substances to give them any desired appearance.

Having thus described my invention, what I claim is—

The new composition of matter consisting of collodion, creosote from Norway beech-tar, boiled linseed-oil, black oxide of manganese, and rosin, in substantially the proportions specified.

CHARLES MOISE JACOB.

Witnesses:
N. TOMREY,
ROBT. M. HOOPER.